UNITED STATES PATENT OFFICE.

ERNEST EDWARDS, OF MIDDLESEX COUNTY, ENGLAND.

IMPROVEMENT IN PRINTING-FORMS.

Specification forming part of Letters Patent No. 134,470, dated December 31, 1872.

*To all whom it may concern:*

Be it known that I, ERNEST EDWARDS, of Lincoln Terrace, Willesden Lane, in the county of Middlesex, Kingdom of Great Britain, have invented a new and Improved Printing Form or Plate; and I do hereby declare that the following is a full, clear, and exact description of the same.

The object of this invention is to produce an improved form or plate from which impressions can be taken in any of the well-known printing-presses, the engraving on which form or plate being produced by the action of light upon it through a photographic negative, as will be hereinafter explained.

The following description will give the best means known to me for carrying my invention into effect.

Upon a surface of metal, slate, wood, stone, glass, porcelain, or other suitable substance, I place a layer of gelatine, gum, albumen, fibrine, or analogous substance; I harden and render it insoluble in water by the addition of ammonia-alum, or other alums, chrome-alum, tannin, or chlorine. This layer is rendered sensitive to light during its preparation, or subsequently, by treating with a bichromate. It is then dried and exposed to light under a negative, and is then freed from bichromate by washing in water, when it is ready for taking printed impressions from, or it may be put away for future use.

In order to remove the gelatinous printing-film, (which I call a form,) from the surface upon which it is prepared to that upon which it is to be placed for printing in a press, I rub the surface upon which the film is to be formed, as already described, with a solution of wax, or of collodion, or India rubber, or other substance, which will allow the removal of the gelatinous film after it has become dry. This film may be exposed to light on either surface for the purpose of forming a picture, and it has then to be attached to the support upon which it is to remain during printing at the press. This support may be such a substance as metal, glass, porcelain, enamel, ebonite, or collodion, and the form is attached to it by placing the two surfaces which are to be attached in contact under water or other fluid, quickly withdrawing them and getting rid of the superfluous water by a rapid pressure in any convenient manner. Glycerine, sugar, castor-oil, or other oil may be added to give flexibility to the film, which may be removed from and attached to its supports at any convenient stage of the operations either before or after exposure to light.

The following is a formula which I prefer to adopt, but which I do not confine myself to as far as the definite proportions are concerned, as they may be changed as I may deem advisable:

A solution of one ounce of gelatine, five grains of chrome-alum, and half a dram of bichromate of potash is to be made in twelve ounces of water at 100° Fahrenheit, and poured over a level glass plate. After the gelatine has set I dry it at a temperature of 70° to 75° Fahrenheit. When dry it is stripped from the glass plate, and then printed on by exposure to light under a negative. When the details of the image appear the printing is complete. It is then placed under water upon a polished pewter plate coated with a solution of India rubber and quickly withdrawn. The two surfaces are passed into close contact, and the plate is steeped in water until the bichromate is soaked out, and it is then ready for printing from in a printing-press.

All the operations while the form is dry, before the bichromate has been washed out, must be conducted by non-actinic light, and it may be kept until wanted and then laid down upon a plate, as described.

The forms thus produced are of such a thickness and of such a degree of consistency throughout that they possess a body and strength sufficient to permit of their being lifted while the photographic image is being produced for the purpose of examining the print, rolled up, or handled in any manner without injury to the plate or defacement of the image or engraving thereon.

Having described my invention, what I claim as new, and desire to secure by Letters Patent, is—

As an article of manufacture, a gelatine printing-form complete in itself, without a base, which has the printing image produced upon it by means of light, and which can be used in the printing-press for a number of impressions, put away, and at subsequent periods used again for an additional number of impressions.

ERNEST EDWARDS.

Witnesses:
JAMES N. CAMPBELL,
JAMES MARTIN, Jr.